United States Patent [19]
Watanabe et al.

[11] Patent Number: 6,088,628
[45] Date of Patent: Jul. 11, 2000

[54] JOG FEEDING METHOD FOR ROBOTS

[75] Inventors: Atsushi Watanabe; Takayuki Ito; Tomoyuki Terada, all of Oshino-mura, Japan

[73] Assignee: Fanuc, Ltd., Yamanashi, Japan

[21] Appl. No.: 09/043,612

[22] PCT Filed: Jul. 24, 1997

[86] PCT No.: PCT/JP97/02571

§ 371 Date: Mar. 24, 1998

§ 102(e) Date: Mar. 24, 1998

[87] PCT Pub. No.: WO98/03314

PCT Pub. Date: Jan. 29, 1998

[30] Foreign Application Priority Data

Jul. 24, 1996 [JP] Japan .................................. 8-214163

[51] Int. Cl.[7] .................................................. G05B 15/00
[52] U.S. Cl. ........................ 700/264; 700/251; 700/257; 700/260
[58] Field of Search .................................. 700/245, 251, 700/257, 264, 260, 246, 258, 261, 262, 250, 253; 395/93, 99, 80, 83; 318/568.19, 568.13, 568.14

[56] References Cited

U.S. PATENT DOCUMENTS

| | | | |
|---|---|---|---|
| 4,482,968 | 11/1984 | Inaba et al. | 364/513 |
| 4,998,050 | 3/1991 | Nishiyama et al. | 318/568.1 |
| 5,086,401 | 2/1992 | Glassman et al. | 395/94 |
| 5,222,156 | 6/1993 | Sorimachi et al. | 382/32 |
| 5,524,180 | 6/1996 | Wang et al. | 600/118 |
| 5,608,618 | 3/1997 | Koaka et al. | 364/167.01 |
| 5,687,295 | 11/1997 | Kaihori et al. | 395/99 |
| 5,748,854 | 5/1998 | Watanable et al. | 395/93 |
| 5,980,082 | 11/1999 | Watanable et al. | 364/191 |

FOREIGN PATENT DOCUMENTS

| | | |
|---|---|---|
| 60-20881 | 2/1985 | Japan . |
| 60-44282 | 3/1985 | Japan . |
| 62-165213 | 7/1987 | Japan . |

*Primary Examiner*—Joseph E. Palys
*Assistant Examiner*—Rijue Mai
*Attorney, Agent, or Firm*—Staas Halsey, LLP

[57] ABSTRACT

An operation section 32 of a teaching operation panel 30 connected to a robot controller 10 through a cable 40 has a general operation section 321 provided with a sub-display 323, and a graphic display operation section 322 for a display 31 provided with a touch panel. When a hand in touch with a hand mark 21' of the robot displayed along with a graphic image 20' is moved on the display screen (as indicated by an arrow A; from a position H1 to a position H2), the touched positions are sequentially sensed by the touch panel and converted to three-dimensional position data by using plane position data (which is calculated based on either a line-of-sight in graphic display or a specifically designated direction of a plane and the latest touched position). Thus obtained three-dimensional position data is, on one hand, used for sequentially updating the display of the graphic image 20', and, on the other hand, sent to the robot controller 10 in order to be used for jog-feeding the robot 20 (as indicated by an arrow A'). A mouse 34 may be used instead of the touch panel. The line-of-sight in graphic display may be determined by a sensor for detecting a three-dimensional orientation.

21 Claims, 7 Drawing Sheets

JOG FEEDING METHOD FOR ROBOTS

TECHNICAL FIELD

The present invention relates to a jog-feeding method for an industrial robot (hereinafter referred to simply as "robot"), and more specifically to a new jog-feeding method utilizing a graphic display of a robot in combination with a pointing device.

BACKGROUND ART

As a method of moving a robot by a manual input operation, a jog-feeding method and a lead-through method are well known. The jog-feeding method is normally performed by operating a moving direction designating member of a robot, such as a jog key or a joy stick on a teaching operation panel.

The jog-feeding provides a convenient method for moving a robot for a desired time period by continuing or discontinuing the operation of the moving direction designating member. The conventional jog feed, however, has restrictions in designating the moving direction. That is, the conventional jog-feeding can designate the moving direction of the robot only along each coordinate axis of a chosen coordinate system (a world coordinate system, a user coordinate system, a tool coordinate system, etc.) (+X, −X, +Y, −Y, +Z, −Z) or around each coordinate axis thereof (+W, −W, +P, −P, +R, −R), and along each of designated robot axes (+J1, −J1, +J2, −J2, ... ).

Because of those restrictions, a tedious operation is needed such as selectively depressing different jog keys many times to make the robot gradually approach and reach a desired target position, unless the desired target position is on a coordinate axis. In addition, since a moving direction of a robot is designated in the indirect manner, it is difficult for an operator to intuitively know the actual moving direction, making the method inconvenient in this aspect.

The lead-through method uses a force sensor attached to a hand of a robot and a lead-through switch. In this method, when an operator applies an external force to make the hand proceed in a desired direction while depressing the lead-through switch, the force sensor detects the direction of the applied external force and transmits the detected direction to a robot controller to make the robot move in the direction of the external force. This method has an advantage in that a moving direction of the robot is designated in a direct manner, it is easy for an operator to recognize the actual moving direction.

However, this method has a significant problem that the operator needs to stand close to the hand of the robot. Thus, if an erroneous operation or a malfunction should happen when the operator stands close to a robot in order to start the lead-through operation or before standing off the robot after finishing the operation, it may bring serious jeopardy to the operator standing close to the hand of the robot.

DISCLOSURE OF INVENTION

An object of the present invention is to solve the problems in the above-mentioned prior art and to provide a jog feeding method capable of moving a robot in a desired direction with an easy operation, securing safety of an operator.

The present invention has solved the above described technical problems by adopting a new jog-feeding method using an operator supporting system connected to a robot controller and having a graphic display function and a pointing device.

The jog feed of the present invention is performed using a system including a robot controller for controlling an operation of a robot, a graphic display device connected to the robot controller for displaying a graphic image of the robot, a pointing device for inputting two-dimensional positions on a display screen of the graphic display device, and a means for converting two-dimensional position input through the pointing device into three-dimensional position output using plane position data.

The jog feed of the present invention is performed basically through the following steps:

(A) displaying an initial graphic image representing an orientation of the robot before the start of movement thereof on the display screen of the graphic display device;

(B) starting a two-dimensional position input for the jog feed on the display screen of the graphic display device using the pointing device;

(C) sequentially converting the two-dimensional position input into a three-dimensional position output based on plane position data;

(D) sequentially updating the graphic image of the robot based on the three-dimensional position output;

(E) moving the robot based on the three-dimensional position output using the robot controller;

(F) terminating the two-dimensional position input using the pointing device for the jog feed.

The step (C) may be performed either externally or internally of the robot controller. In the former case, a signal representing the three-dimensional position output is transmitted to the robot controller to be used in the step (E). In the latter case, a signal representing the three-dimensional position output is transmitted to the graphic display device to be used at the step (D).

The pointing device may take the form of a display screen of the graphic display device provided with a touch panel or a mouse with a function of displaying a mouse cursor.

In the former case, the two-dimensional position input is performed by a manual touch on the display screen. The two-dimensional position input in the step (B) is started by a manual touch on a graphic image of a hand of the robot displayed on the display screen of the graphic display device, and terminated in the step (F) by terminating the manual touch at a position different from the position where the manual touch was started on the display screen.

In the latter case, the two-dimensional position input is performed by the mouse. The two-dimensional position input in the step (B) is started by a first click of the mouse with the mouse cursor positioned at a graphic image of the hand of the robot displayed on the display screen of the graphic display device, and terminated in the step (F) by a second click of the mouse at a position different from the position of the first click of the mouse on the display screen.

In respect of timing for moving the robot in the step (E), the following four modes are practical although other modes are also possible.

1. The step (E) is performed substantially synchronously with the step (C).

2. The step (E) is started immediately after the step (F) is completed.

3. The step (E) is started after a predetermined time period set in the system from the time when the step (F) is completed.

4. The step (E) is started after a predetermined time period set in the system from the time when the step (B) is completed.

As a way of creating the plane position data to be used in converting the two-dimensional position input to the three-dimensional position output, the following two modes are practical.

1. The plane position data is created based on a line-of-sight of the graphic image of the robot and the latest three-dimensional position data corresponding to the two-dimensional position input.

2. The plane position data is created based on a direction of a plane previously taught to the system and the latest three-dimensional position data corresponding to the two-dimensional position input.

The graphic display device may be provided with a sensor for detecting a three-dimensional orientation thereof, so that the line-of-sight of the graphic image of the robot is determined in accordance with an orientation detected by the sensor.

BEST MODE OF CARRYING OUT THE INVENTION

Figure 1:
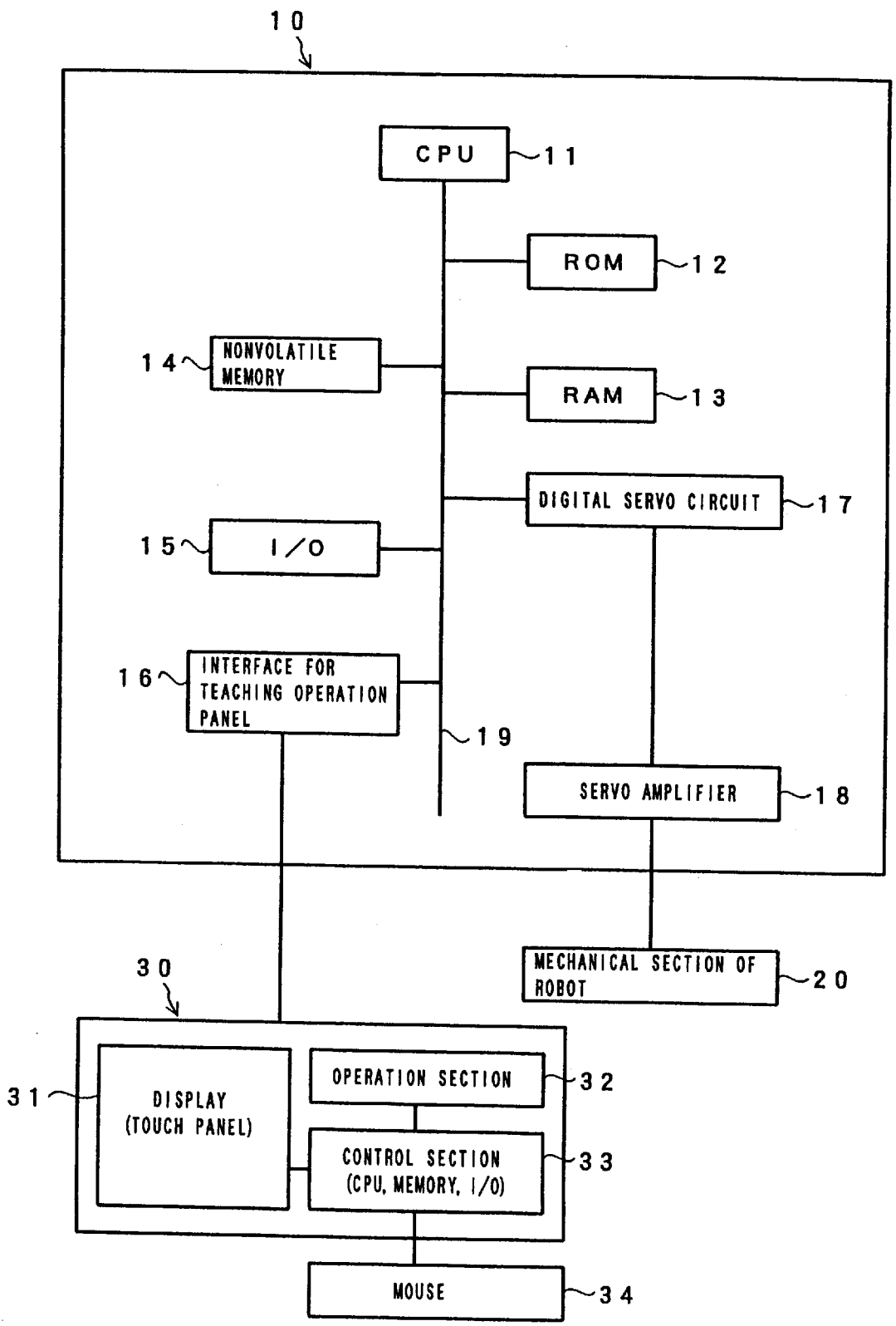
FIG. 1 is a block diagram showing essential elements of one example of a system for carrying out the method of the present invention.

FIG. 1 is a block diagram showing essential elements of a system for carrying out the method of the present invention. Referring to FIG. 1, reference numeral 10 denotes a robot controller, which is the center of the whole system and includes a central processing unit (hereinafter referred to as "CPU") 11. With the CPU 11 are connected through a bus 19 a memory 12 provided as a ROM, a memory 13 provided as a RAM, a nonvolatile memory 14, an input-output device 15 which functions as an interface for external devices other than a teaching operation panel, a teaching operation panel interface 16 for a teaching operation panel 30, and a digital servo circuit 17, respectively.

A robot axis control section 17 for controlling movement of each axis of a mechanical section 20 of the robot through a servo circuit 18 is also connected through the bus 19 to the CPU 11.

In the ROM 12 is stored a program for controlling the whole system inclusive of the robot controller 10 itself. The RAM 13 is a memory for temporarily storing data which is used in processing by the CPU 11. In the nonvolatile memory 14 are stored programs and data necessary for performing the method of the present invention described later, in addition to operation program data for the robot and various set values related to operation of each section of the system. The servo circuit 17 receives a motion command from the CPU 11 and controls the operation of the motor for each axis of the mechanical section 20 of the robot body through the servo amplifier 18.

The teaching operation panel 30 connected to the teaching operation panel interface 16 also functions also as a graphic display device for displaying a graphic image of the robot 20. The teaching operation panel 30 includes a display 31, an operating section 32 including a key board etc., and a control section 33 having a CPU, a memory, an input-output device, etc., and is provided with a pointing device for designating a specific position on the display 31 by a manual operation. In the present embodiment, a touch panel is adopted for the display 31 so as to constitute the pointing device, and the operating section 32 has a graphic display operation section (see FIG. 3 which will be described later). A mouse 34 may be used instead of or in addition to the touch panel. The latter case (provided with both a touch panel and a mouse) will be explained in the present embodiment.

The memory of the control section 33 is previously stored with shape data necessary for graphic display of the robot and a program for performing representation by CG technique, for example, wire frame representation (software for computer graphics). To start the graphic display, the teaching operation panel 30 receives data on the current orientation of the robot from the robot controller 10, to thereby display, through processing by CG software, the current orientation of the robot graphically on the display 31 under the display conditions designated by the graphic operation section.

After the graphic display is started, the graphic image of the robot is updated based on two-dimensional data on the position of a hand of the robot which is designated by the touch panel or the mouse, as well as based on the data for designating a plane (described later in detail).

The robot controller 10 receives three-dimensional position data prepared by the teaching operation panel 30, and thereby controls the movement of the robot. The processing performed in the teaching operation panel 30 and the robot controller 10 which supports the above described functions will be described later.

Figure 2:
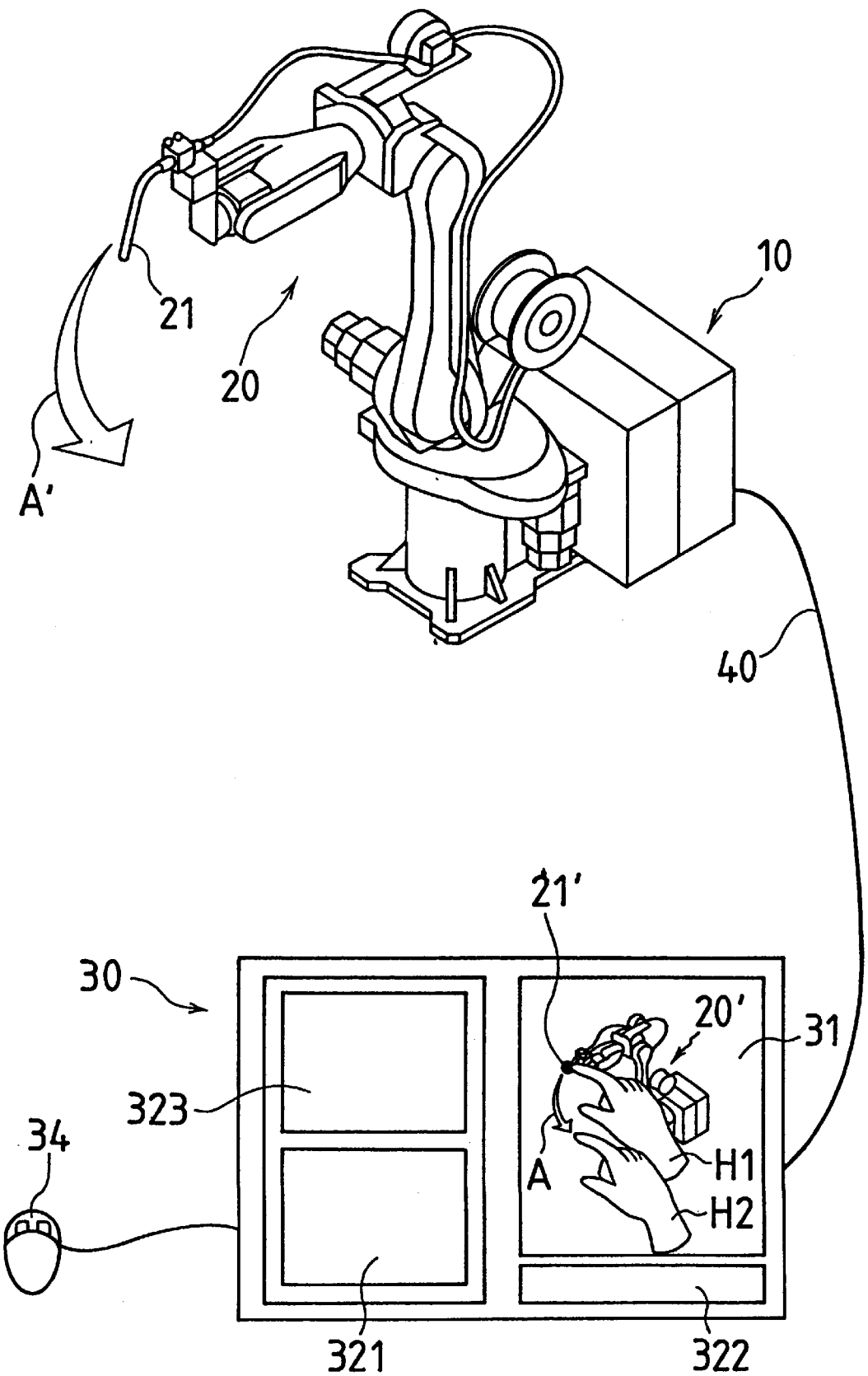
FIG. 2 is a diagram schematically showing the whole arrangement using the system shown in FIG. 1 and the jog feed according to the present invention.

FIG. 2 illustrates the whole arrangement using the system described above and the way of jog-feeding according to the present invention. As seen from FIG. 2, the robot controller 10 is arranged beside the robot (real robot) 20. The teaching operation panel 30 is connected to the robot controller 10 through a cable 40. The teaching operation panel 30 is therefore operated at a distance from the robot 20. The mouse 34 can be connected to the teaching operation panel 30 as an option.

The operation section 32 of the teaching operation panel 30 has a general operation section 321 for a general manual input operation and a graphic display operation section 322 for an operation related to graphic display on the display 31. The general operation section 321 has a sub-display 323 which displays a variety of things in characters. The display 31 is a liquid-crystal display provided with a known touch panel, and is preferred to be capable of providing color display.

Figure 3:
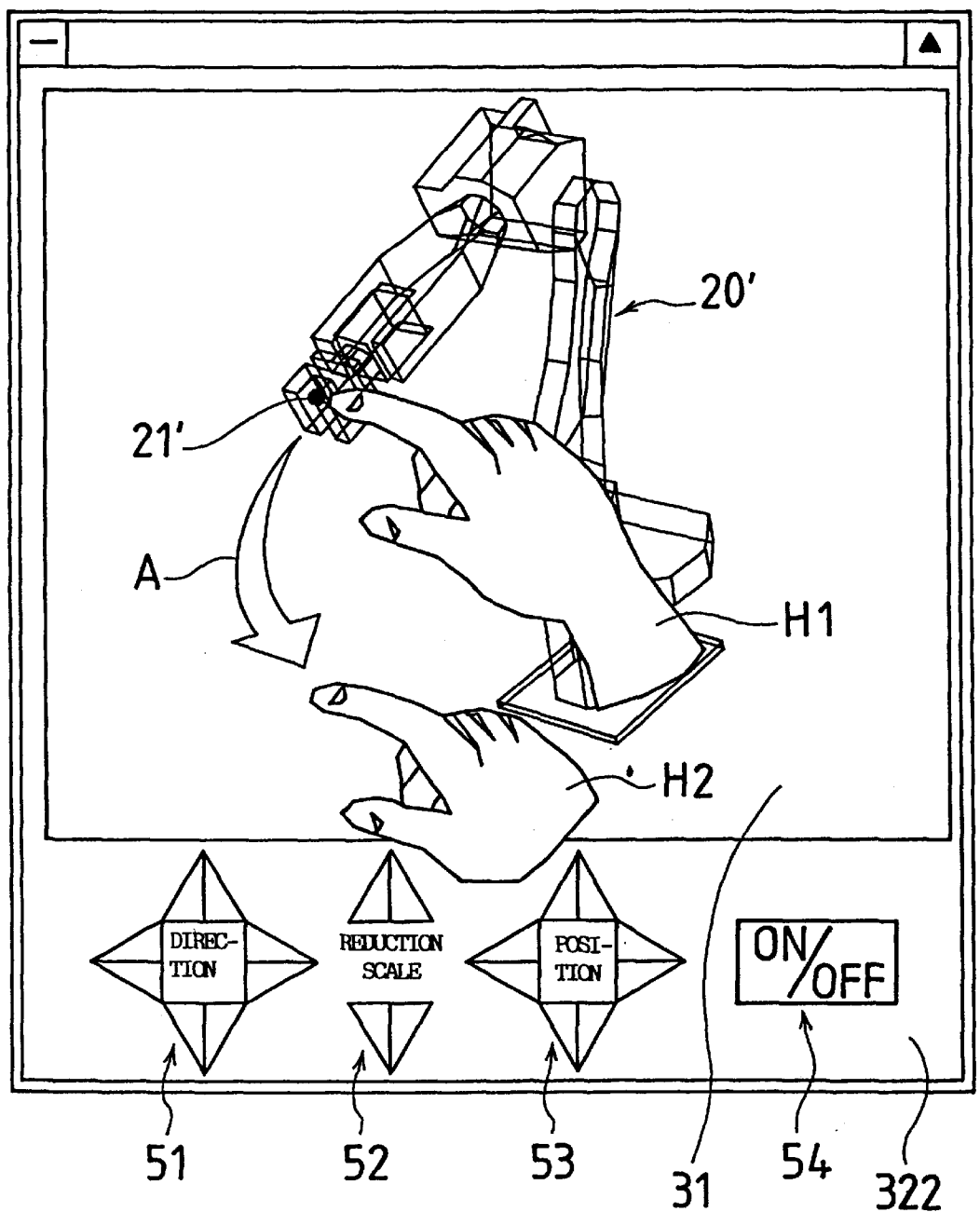
FIG. 3 is a diagram schematically showing an example of a graphic display operation section with a motion of an operator's hand when using a touch panel.

FIG. 3 is an illustration showing an example of the graphic display operation section 322 in which a movement of an operator's hand while using the touch panel is also indicated (the screen of the display 31 shown in FIG. 2 is shown on an enlarged scale). As shown in FIG. 3, the graphic display operation section 322 has operation buttons 51 to 54. The operation buttons 51 to 53 are provided to adjust a line-of-sight, a reduction scale and a visual point in graphic display, respectively. The buttons 51 and 53 are composed of four separate touch buttons, respectively, and the line-of-sight and the visual point can be adjusted upward, downward, to the left and to the right by touching corresponding one of four touch buttons of the buttons 51 and 53. The reduction scale control button 52 is composed of two separate touch buttons, which can be used to increase and decrease the display magnification by selectively touching one of the two touch buttons. The button 54 is a graphic display on/off touch button.

Referring to FIGS. 2 and 3, the procedure of jog-feeding operation according to the present invention and the actions of various components of the system during the operation will be outlined below.

1. First, by operating the general operation section 321, jog-feeding mode (jog-feeding according to the present invention) is designated and inputted to the system by the pointing device.

2. In this state, the graphic display on/off button 54 is depressed. By doing so, a graphic image 20' of a robot is displayed on the display 31 (initial display). At this stage, display is made under preset basic display conditions or under the display conditions same as those under which the preceding display when display was turned off. Data on an orientation of the robot necessary for initial representation is supplied from the robot controller 10.

3. Further by operating the general operation section 321, either a touch panel or a mouse is designated as a pointing device, and the designation is inputted to the system (a touch panel mode or a mouse mode is selectively designated). When the mode is designated, a hand mark 21' indicating the hand of the robot is displayed and highlighted on the display screen. The shape of the mark 21' indicating the hand of the robot to be displayed is preferred to differentiated depending on whether a touch panel mode or a mouse mode is designated.

4. In order to obtain three-dimensional position data (hereinafter referred to as "three-dimensional position data") based on the output of the pointing device, an operation for designating a plane is performed by operating the general operation section 321. The operation for designating a plane is performed in either of the following modes.

(a) An automatic designation mode: In this mode, a plane lying through the latest position of the hand of the robot indicated by the pointing device (normally the position of a TCP) and being parallel to the graphic display plane is automatically designated. The direction of the plane can be changed by modifying the line-of-sight in graphic display (procedure for the modification of line-of-sight will be described later).

(b) A specific plane designation mode: In this mode, a parameter for positively designating a direction of a plane is designated independently. To be more specific, this mode is designed to specify code number of a desired reference coordinate system (for example, a work coordinate system) and to input component values of a normal vector representing a direction of a plane. For example, if values (1, 0, 0) are inputted as component values of a normal vector, a plane which is parallel to a YZ plane of the designated coordinate system and lying through the latest position of the hand of the robot indicated by the pointing device is designated.

5. Desired jog-feeding is manually inputted by using the pointing device either in the manner (a) or in the manner (b) described below.

(a) In the case where the touch panel mode is selected (a mouse is not used), the mark 21' indicating the hand of the robot on the graphic display image 20' of the robot 20 is touched by a hand H1 (start of input of two-dimensional position by manual touching). In the teaching operation panel 30, a sequential calculation is started for determining a three-dimensional position of the hand of the robot corresponding to its virtual position on the display screen, based on two-dimensional data on the touched position and data on the position on the plane, and the result of the calculation starts to be sent to the robot controller 10.

Then, the hand (finger tip), while being kept touching the image on the screen, is moved from a position H1 to a position H2 as indicated by an arrow A, and is then taken off the image on the screen to finish the input of two-dimensional position. During this process, data representing a locus of a touch point by the finger tip from H1 to H2 on the display screen (two-dimensional data) is sequentially converted into three-dimensional position data based on the two-dimensional position data, and sent to the robot controller 10. Based on that data, the robot controller 10 sequentially determines target positions to which the robot should move, and prepares a motion command accordingly.

Here, how to obtain a three-dimensional position data based on the two-dimensional position data, which represents the position on the plane designated by the plane designation mode, will be explained briefly.

In general, to determine a position on a plane, it is sufficient to determine (1) a direction of a plane and (2) a point through which the plane lies. In the above described automatic designation mode, (1) the direction of a plane is defined by the line-of-sight of a graphic display, and (2) one point through which a plane lies is defined by the latest position of the hand of the robot indicated by the pointing device (normally, the position of the TCP).

Data on the line-of-sight is possessed by the teaching operation panel 30, and data on the latest position of the hand of the robot indicated by the pointing device can be obtained as the result of the calculation performed previously by the teaching operation panel 30. However, the initial data on the real machine of the robot is supplied from the robot controller 10 (Refer to transmission and reception of initial display data in processing steps 1 and 2, which will be described later).

In the specific plane designation mode, (1) a positively designated parameter (normal vector data) determines the direction of a plane, and (2) the latest position of the hand of the robot indicated by the pointing device defines a point through which the plane lies, as in the case of the automatic designation mode.

Thus, in either of the plane designation modes, the plane position data can be obtained based on the data defining the direction of a plane (calculated based on the line-of-sight or designated positively) and the three-dimensional position obtained by the last calculation. When the plane position data is obtained, a three-dimensional position currently indicated by the pointing device can be obtained as a position at which the plane and a line corresponding to the visual line passing through the point currently indicated by the pointing device intersect each other.

By the jog-feeding operation described above, the front end of the robot image 20' on the display screen moves and stops as indicated by an arrow A'. On the other hand, the hand of the robot (real robot) 20 also moves and stops as indicated by an arrow A'. The position where the real robot stops corresponds to the position on the robot image at which an operator takes his or her hand off the touch panel.

(b) In the case where the mouse mode is chosen (a touch panel is not used), a cursor (not shown) of a mouse 34 is placed on the mark 21' of the hand of the robot on the graphic display image 20' of the robot 20, and then the mouse is clicked (start of input of two-dimensional positions by clicking of the mouse). By doing so, two-dimensional data on the touched position starts to be sent to the robot controller 10.

After the mouse 34 is moved in the direction indicated by an arrow A, the mouse is clicked again (input of two-dimensional position ends). In the meantime, data representing a locus of the mouse cursor on the display screen (two-dimensional data) is sequentially converted into three-dimensional position data by using the plane designation data and sent to the robot controller 10. Based on this data, the robot controller 10 sequentially determines a target position of the robot, and prepares a motion command.

Since the way of obtaining three-dimensional position data on the teaching operation panel 30 side is the same as that in the case where the touch panel mode is chosen, the explanation thereof will be omitted to avoid repetition. The position where the robot (real robot) 20 stops corresponds to the position on the display screen at which the mouse cursor stands when the mouse 34 is clicked to end the jog (for example, when a second click is given to the mouse).

Figure 4:
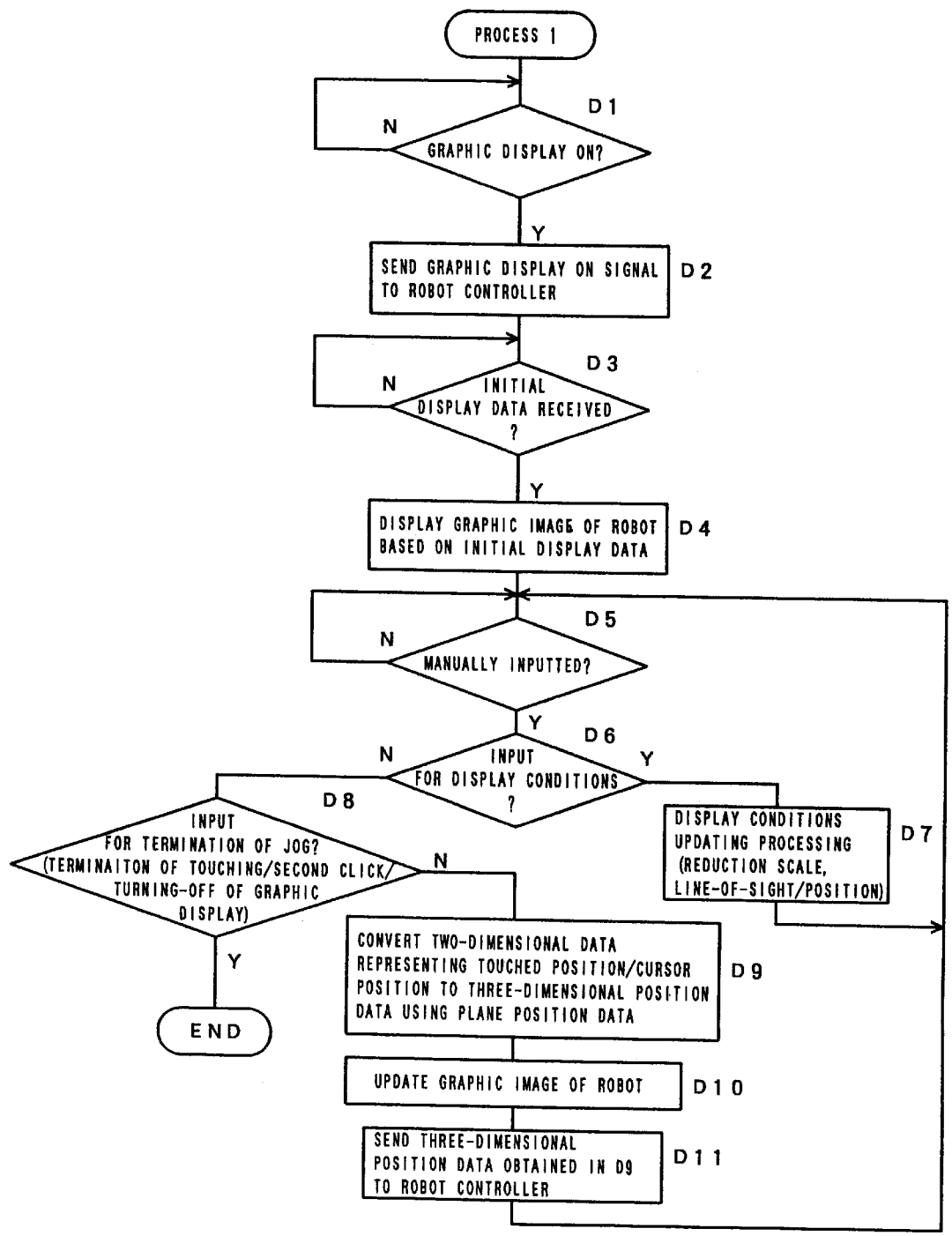
FIG. 4 is a flowchart generally showing a process to be performed in a teaching operation panel in an embodiment of the present invention.
Figure 5:
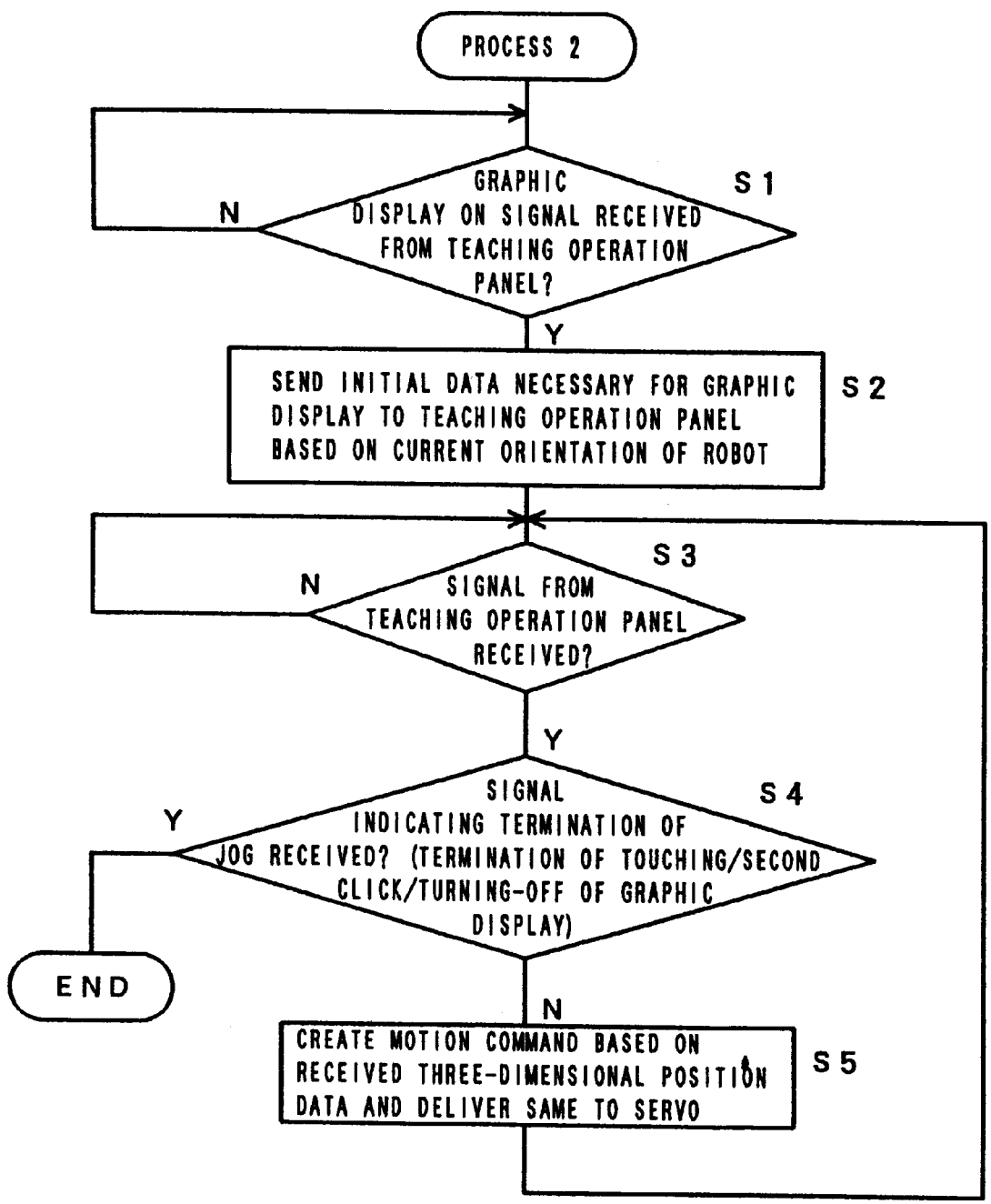
FIG. 5 is a flowchart generally showing the processing to be performed in a robot controller in the embodiment.

Based on the above described arrangement and function, the processing to be performed in the robot controller 10 and the teaching operation panel 20 will be outlined referring to the flowcharts shown in FIGS. 4 and 5.

[Processing on the Teaching Operation Panel Side (Process 1; FIG. 4)]

(D1) When the button 54 is depressed (turning on) to output display-ON command, the processing proceeds to step D2.

(D2) The graphic display-ON signal is sent to the robot controller 10.

(D3) Upon receipt of initial display data for graphic display of the current orientation of the robot from the robot controller 10, the processing proceeds to step D4. This initial display data includes the parameters concerning the structure of the robot and current robot orientation data, which are necessary for graphic display of the robot. (Both can be described together, for example, by using D–H parameters.)

(D4) A robot image 20' (initial image) together with the front end mark 21' are graphically displayed by using the initial display data sent from the robot controller 10.

(D5) Manual input by operating the graphic display section 322 or by using the pointing device (the touch panel or the mouse) is to be awaited. The manual input comprises the following three types. When manual input is given, the processing proceeds to step D6.

(a) Input related to display conditions: To be output by depressing one of the buttons 51, 52 and 53.

(b) Input commanding to end jog operation: To be output either by stopping a touch on the display screen or by clicking for ending jog operation (a second click), or by depressing (turning off) the button 54.

(c) Input by the pointing device: To be made by touching the front end mark 21' with an operator's hand (finger tip) (in the case of the touch panel mode) or by clicking the mouse 34 at the position of the front end mark 21' (a first click).

(D6) If the manual input is related to display conditions, the processing proceeds to step D7. If not, it proceeds to step D8.

(D7) Display conditions are updated depending on the button depressed among the buttons 51 to 53, and updated the graphic image is displayed. Of the display conditions, the line-of-sight is controlled by the button 51, the reduction scale is controlled by the button 52 and the position of a visual point is by the button 53. Since software relating to the control of such display conditions is well known as common techniques in CG, detailed explanation thereof will be omitted.

(D8) If the manual input is that commanding to the end jog feeding (stopping of touching, a click commanding to the end of jog feeding, or commanding to turn off of graphic display), the processing is terminated. If not, it proceeds to step D9.

(D9) Processing is carried out according to the input by the pointing device.

(a) Case of the touch panel mode: Two-dimensional data representing a touched position is converted into an updated three-dimensional position data by using the plane designation data and three-dimensional position data obtained by the last calculation.

(b) Case of the mouse mode: Two-dimensional data representing a mouse cursor position is converted into an updated three-dimensional position data by using the three-dimensional position data obtained by the last calculation.

In each of the cases (a) and (b), how to determine a plane is already described before. Therefore, the explanation thereof will be omitted here to avoid repetition.

(D10) The teaching operation panel graphically displays a robot image 20' together with a front end mark 21' by using the three-dimensional position data representing the position of the hand of the robot which has been obtained in step (D9). To calculate a robot orientation corresponding to the updated three-dimensional position data representing the position of the hand of the robot which has been calculated in step (D9) (necessary for updating of the graphic display), it is sufficient to perform inverse transformation processing on the teaching operation panel 30 side.

Alternatively, the robot orientation may also be obtained in such a manner that the updated three-dimensional position data representing the position of the hand of the robot which has been calculated in step (D9) is sent to the robot controller 10 to perform inverse transformation on the robot controller 10 side, and the result of inverse transformation is sent back to the teaching operation panel 30. In this case, the result of inverse transformation can be used to prepare a motion command to the real robot 20.

(D11) The three-dimensional position data representing the position of the hand of the robot obtained in step (D9) is output to the robot controller, and the processing returns to step D5.

[Processing on the Robot Controller Side (Process 2; FIG. 5)]

(S1) Upon receipt of a graphic display-ON signal from the teaching operation panel 30, the processing proceeds to step S2.

(S2) The initial display data for graphic display of the current orientation of the robot is sent to the teaching operation panel 30.

(S3) Upon receipt of a signal from the teaching operation panel 30, the processing proceeds to step S4.

(S4) Upon receipt of the signal indicating the end of jog feeding, the robot controller stops the robot or, with the robot kept stopped, the processing is stopped. The jog operation stop signal is received when a touch on the display screen is stopped, when a click commanding to end jog operation (a second click) is output, or when the button 54 is depressed (turned off) on the teaching operation panel 30.

(S5) Here, besides the signal representing the ending of jog operation, a signal representing a touched position/ mouse cursor position are supposed to be available in the form of three-dimensional position data to be calculated on the teaching operation panel 30, as the signals to be sent from the teaching operation panel 30. Using the three-dimensional position data, a target position of the robot (for front end 21), and a motion command is output to be delivered to the servo motor.

In the above described embodiment, the real robot moves synchronously following the movement of the touched position on the touch panel or the movement of the mouse cursor position. Alternatively, however, the real robot may be moved in the following mode (1) or (2).

(1) A mode in which the robot starts moving immediately after the input of positions ends (i.e., after touching is stopped or after a click for commanding to end jog feeding). For example, the operation in this mode can be carried out in such manner that all or part of data on a locus of the touched position or the mouse cursor position which has been converted into three-dimensional position data (it is to be noted that data on an end point is indispensable) is sent to the robot controller to move the robot, after touching is stopped or after a click for commanding to end jog feeding is made. Alternatively, timing for moving the robot may be determined on the synchronized robot controller side, provided that the data is sent to the robot controller as soon as possible.

(2) A mode in which the robot starts moving when a positively determined time (for example, one second) has passed after starting or ending the input of positions. In order to carry out the operation in this mode, it is sufficient, for example, to send the data converted into three-dimensional position data to the robot controller with a delay corresponding to the above-mentioned positively determined time. Also, in this mode, timing for moving the robot may be determined on the synchronized robot controller side, provided that the data is sent to the robot controller as soon as possible.

It goes without saying that the conversion of two-dimensional position input into three-dimensional position data can be performed not on the teaching operation panel side but on the robot controller side. In such a case, data sent from the teaching operation panel to the robot controller is two-dimensional position data, and three-dimensional position data prepared on the robot controller side is sent back to the teaching operation panel side to update the graphic image.

Lastly, as a modified example of the above described embodiment, an embodiment, in which a sensor capable of detecting a three-dimensional orientation is used to determine the line-of-sight of graphic image display of the robot, will be explained. This modified embodiment is characterized by that a sensor capable of detecting a three-dimensional orientation such as a gyro sensor is provided to a teaching operation panel which functions also as a graphic display device, so that the line-of-sight of graphic display can be determined based on an orientation detected by such sensor. This embodiment will be outlined particularly attending to differences the other embodiment.

Figure 6:
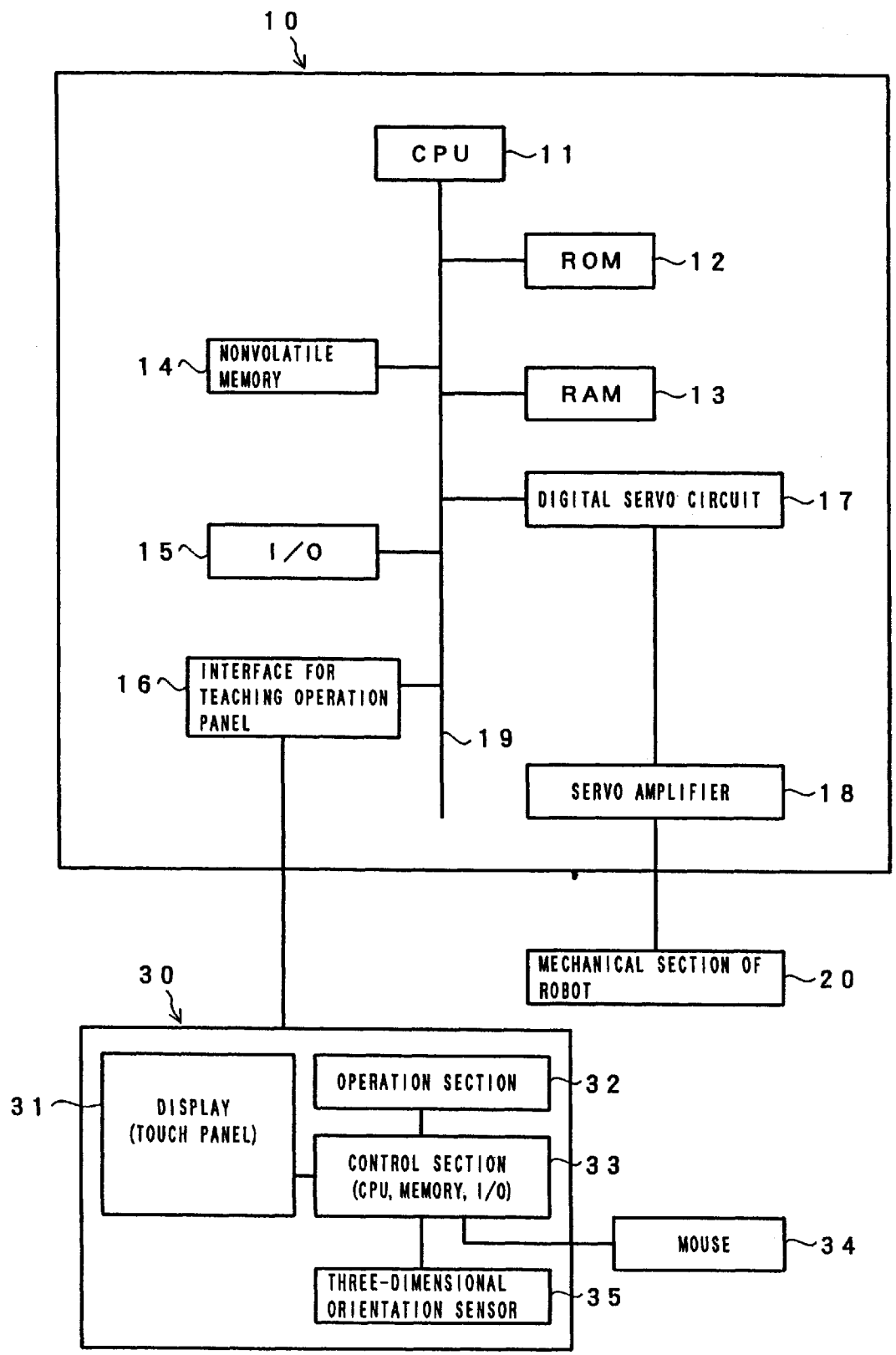
FIG. 6 is a block diagram showing essential elements of another example of a system for carrying out the method of the present invention.

FIG. 6 is a block diagram showing principal components of structure for use in the modified embodiment. As shown in FIG. 6, the system is substantively the same as that shown in FIG. 1, except that a sensor capable of detecting a three-dimensional orientation such as a gyro sensor is provided to a teaching operation panel 30 which is connected to a teaching operation panel interface 16.

Specifically, the teaching operation panel 30 includes a display 31, an operation section 32 including a key board etc., a control section 33 having a CPU, a memory, an input-output device, etc., and a three-dimensional orientation detecting sensor 35 such as a gyro sensor, and is provided with a pointing device for designating a specific position on the display 31 by a manual operation.

As in the embodiment described before, a touch panel is adopted for the display 31 so as to constitute the pointing device, and the operation section 32 has a graphic display operation section 322. A mouse 34 may be used instead of or in addition to the touch panel, similarly to the case of the embodiment described before.

The three-dimensional orientation detecting sensor 35 detects a three-dimensional orientation on the teaching operation panel 30, and the output thereof is sent to the control section 33 to be used for determining the line-of-sight in graphic display. Typically, a direction vertical to the display plane of the display 31 is considered to be an orientation direction.

In the memory of the control section 33 are stored previously with shape data necessary for graphic display of the robot and a program for rendering by CG technique, for example, wireframe rendering (software for computer graphics). When graphic display is started, the teaching operation panel 30 receives data on the current orientation of the robot from the robot controller 10, to thereby display, through processing by CG software, the current orientation of the robot graphically on the display 31, under display conditions designated by the graphic operation section and under orientation conditions detected by the three-dimensional orientation detecting sensor 35.

After the graphic display is started, the graphic image of the robot is updated based on two-dimensional data on the position of a hand of the robot, which is designated by the touch panel or the mouse, and data for designating a plane. Here, the data for designating a plane includes data on the orientation detected by the three-dimensional orientation detecting sensor 35.

Figure 7:
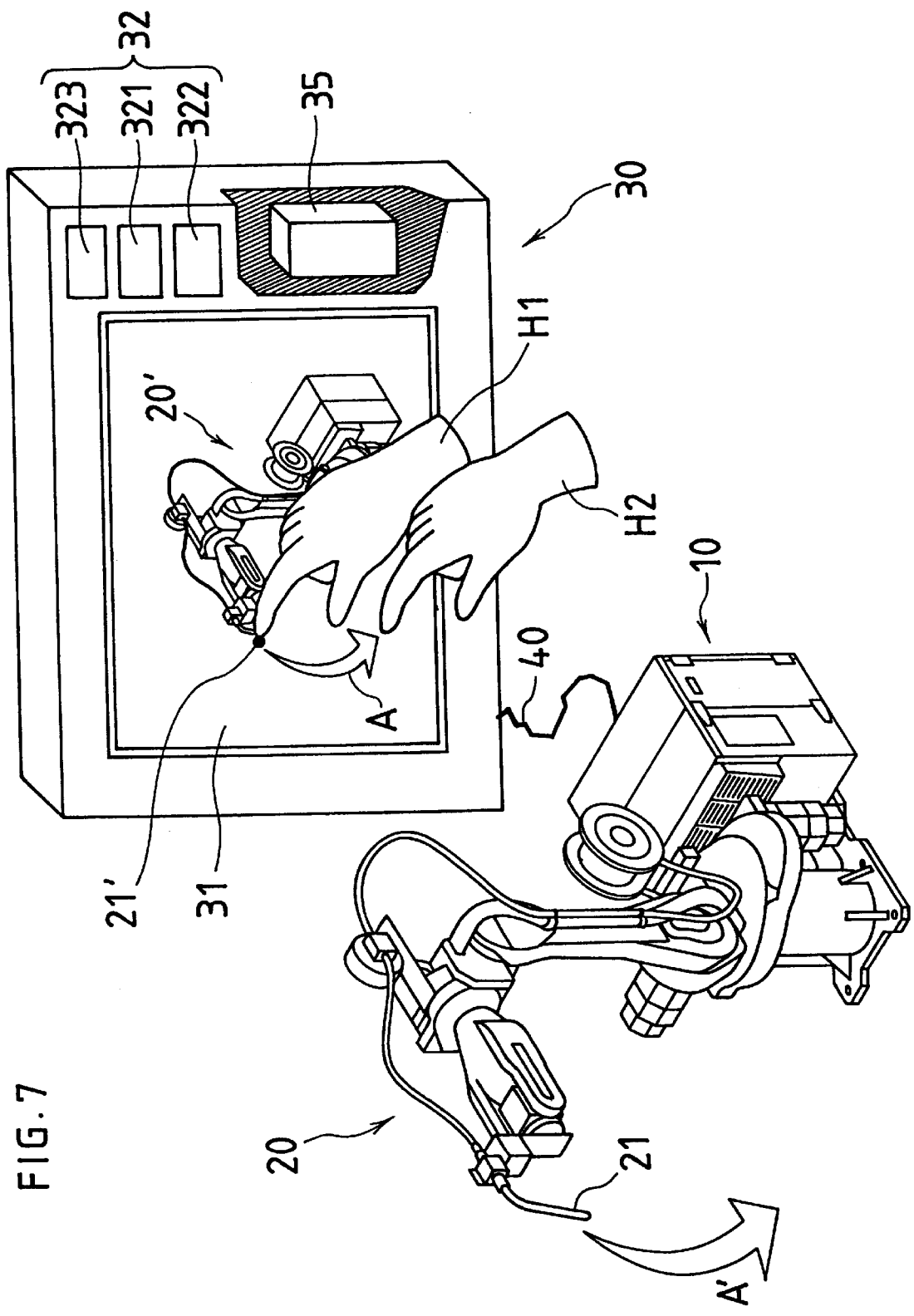
FIG. 7 is a diagram schematically showing the whole arrangement using the system shown in FIG. 6 and the jog feed according to the present invention.

FIG. 7 is an illustration for showing the whole arrangement using the system shown in FIG. 6 and explaining the jog-feeding according to the present invention. This arrangement is substantively the same as that in the case of the system of FIG. 2, except that a sensor capable of detecting a three-dimensional orientation such as a gyro sensor is provided to the teaching operation panel 30 which functions also as a graphic display device.

In other words, as shown in FIG. 7, the robot controller 10 is arranged beside the robot (real robot) 20. The teaching operation panel 30 is connected to the robot controller 10 through a cable 40. The teaching operation panel 30 is therefore operated at a distance from the robot 20. The mouse 34 can be connected to the teaching operation panel 30 as an option.

The operation section 32 of the teaching operation panel 30 includes a three-dimensional orientation detecting sensor 35 such as a gyro sensor, in addition to a general operation section 321 for a general manual input operation and a graphic display operation section 322 for operation related to graphic display on the display 31. The general operation section 321 has a sub-display 323 which displays a variety of things in characters.

The display 31 is a liquid-crystal display provided with a known touch panel, and is preferable to be capable of providing color display.

The structure and the function of the graphic display operation section 322 are similar to those described referring to FIG. 3, except that the operation button 51 for controlling the line-of-sight in graphic display is omitted (or invalidated), since the three-dimensional orientation detecting sensor 35 is adopted. Therefore the explanation thereof will be omitted to avoid repetition.

The procedure of jog-feeding operation in the present embodiment and the action of each element of the system caused by the operation will be outlined below. Things are similar to those in the embodiment described before, except the way of determining the line-of-sight.

1. By operating the general operation section 321, a jog-feeding mode is designated by using a pointing device, and the designation is inputted to the system.

2. In this state, a graphic display on/off button 54 is depressed. By doing so, a graphic image 20' of a robot is displayed on the display 31 (initial representation). In this case, display is made under preset basic display conditions or under the same display conditions as those which defined the display turned off last. Data on an orientation of the robot necessary for initial representation is supplied from the robot controller 10.

3. Further, by operating the general operation section 321, a touch panel or a mouse is designated as a pointing device, and the designation is inputted to the system (selection of either touch panel mode or a mouse mode). When the designation is done, a front end mark 21' indicating a hand of the robot is displayed and highlighted on the display screen. It is preferable that the form of display of a hand mark 21' of the robot differs depending on whether a touch panel mode or a mouse mode is designated.

4. In order to obtain data representing a three-dimensional position based on the output of the pointing device, a plane is designated by operating the general operation section 321.

In this modified embodiment, a plane can be designated in either of the following modes (a) and (b).

(a) An automatic designation mode, in which a plane lying through the latest position of the hand of the robot indicated by the pointing device (normally the position of a TCP) and is parallel to the display plane is automatically designated. A plane parallel to the display plane can be obtained internally in the operation section 33, based on the output of the three-dimensional orientation detecting sensor 35.

Therefore, an operator can change the direction of the plane by modifying a holding orientation of the teaching operation panel 30 (modification of the line-of-sight will be described later).

(b) A specific plane designation mode, in which a parameter to positively designate a direction of a plane is designated. Specifically, a code number of a desired reference coordinate system (for example, a work coordinate system) is designated, and component values of a normal vector representing a direction of a desired plane are inputted. For example, if values (1, 0, 0) are inputted as component values of a normal vector, a plane, which is parallel to a YZ plane of the designated coordinate system and lying through the latest position of the hand of the robot indicated by the pointing device, is designated.

5. Desired jog-feeding is manually inputted by using the pointing device either in the manner (a) or in the manner (b) described below.

(a) In the case where the touch panel mode is selected (a mouse is not used), the hand mark 21' of the robot on the graphic display image 20' of the robot 20 is touched by a hand H1 (start of input of two-dimensional positions by manual touching). In the teaching operation panel 30 starts a sequential calculation of a three-dimensional position, corresponding to a virtual position on the display screen of the front end of the robot, based on two-dimensional data on the touched position and the plane position data, and the result of the calculation starts to be sent to the robot controller 10.

The hand (finger tip) is kept touching the display screen and moved from a position H1 to a position H2 as indicated by an arrow A, and is then taken off the display screen (the input of two-dimensional positions ends). During this movement, data representing a locus of a touch point by the finger tip from H1 to H2 on the display screen (two-dimensional data) is sequentially converted into data representing three-dimensional positions by using the plane position data, and sent to the robot controller 10. Based on this data, the robot controller 10 sequentially determines target positions of the robot to prepare motion command.

The procedure for obtaining three-dimensional position data based on the plane position data, which represents the position of the plane designated in a chosen plane designation mode, is substantially the same as that in the embodiment described before, except that data on the line-of-sight is obtained from the output of the three-dimensional orientation sensor 35.

That is, a position of a plane can be determined by designating (1) a direction of a plane and (2) a point through which the plane lies. In the above described automatic designation mode, (1) data on the line-of-sight in graphic display, which is obtained based on the output of the three-dimensional orientation sensor 35, determines the direction of a plane, and (2) the latest position of the hand of the robot indicated by the pointing device (normally, the position of the TCP) defines a point through which the plane lies.

Data of the line-of-sight is possessed by the teaching operation panel 30, and data of the latest position of the hand of the robot, indicated by the pointing device, can be obtained as the result of the calculation performed last by the teaching operation panel 30. However, data of the real robot supplied from the robot controller 10 can be used as initial data (Refer to the transmission and reception of initial data in processes 1 and 2 in the embodiment described before).

In the specific plane designation mode, (1) a positively designated parameter (normal vector data) determines the direction of a plane, and (2) the latest position of the hand of the robot indicated by the pointing device defines a point through which the plane lies, as in the case of the automatic designation mode.

Thus, in either of the plane designation modes, the plane position data can be obtained based on data representing the direction of the plane (calculated based on the line-of-sight or designated positively) and the three-dimensional position obtained by last-performed calculation. When the plane position data is obtained, a three-dimensional position can be determined as a position of an intersection of the plane and a line corresponding to the line-of-sight passing through the position currently indicated by the pointing device.

By the jog-feeding operation described above, the hand A' of the robot 20' imaged on the display screen moves and stops as indicated by the arrow A', and the hand of the real robot 20 also moves and stops following the movement of its image indicated by the arrow A'. The position where the real robot stops corresponds to the position on the display screen at which an operator takes his or her hand off the touch panel.

(b) In the case where the mouse mode is chosen (a touch panel is not used), a cursor (not shown) by a mouse 34 is placed on the hand mark 21' of the robot on the graphic display image 20' of the robot 20, and then the mouse is clicked (Input of two-dimensional positions by clicking the mouse starts). With this clicking, two-dimensional data on the touched position starts to be sent to the robot controller 10.

After moving the mouse 34 in the direction indicated by an arrow A, the mouse is clicked again (The input of two-dimensional position ends). In the meantime, data representing a locus of the mouse cursor on the display screen (two-dimensional data) is sequentially converted into three-dimensional positions data by using the plane designation data and sent to the robot controller 10. Based on this data, the robot controller 10 sequentially determines target positions to which the robot should move, and generates a motion command.

Since the procedure for obtaining three-dimensional position data on the teaching operation panel 30 side is the same as that in the case where the touch panel mode is chosen, the explanation thereof will be omitted to avoid repetition. The position where the real robot 20 stops corresponds to the position on the display screen at which the mouse cursor stands when the mouse 34 is clicked to end the jog feeding (For example, a second click is given to the mouse).

In the present modified embodiment, the essentials of processing performed in the robot controller 10 and in the teaching operation panel 20 respectively are substantively the same as those described referring to the flowcharts shown in FIGS. 4 and 5 (in the embodiment described before), except the differences described below. Therefore, detailed explanation thereof will be omitted.

(Differences as Compared with the Previous Embodiment)

1. The input (manual input) related to display conditions in step D5 in the processing performed on the teaching operation panel side (the process 1; see FIG. 4) is made by depressing one of the buttons 52 and 53. The button 51 is not provided or invalidated. Instead, the output of the three-dimensional orientation sensor 35 is checked. "When one of the buttons 52 and 53 is depressed" or "when the output of the three-dimensional orientation sensor 35 shows, as compared with that checked last time, a variation exceeding a predetermined variation (which means the change in the orientation on the teaching operation panel 30) or when the output of the three-dimensional orientation sensor 35 is checked for the first time", the processing proceeds to step D6.

2. In step D7, the display conditions are updated according to depressed buttons of the buttons 52 and 53 and the output of the three-dimensional orientation sensor 35, and displayed as updated graphic image. The display condition to be modified according to the output of the three-dimensional orientation sensor 35 is the line-of-sight.

As is clear from the detailed description made referring to the two examples of embodiments, according to the present invention the robot can surely be moved by jog-feeding in a direction utilizing the intuition of an operator too, without undergoing tedious procedure such as frequently depressing a jog-feeding key and without requiring labor for confirming the orientation of a coordinate system. Therefore, the operability of the robot, as well as the efficiency in position teaching operation by teaching playback method or the like can be improved.

What is claimed is:

1. A jog-feeding method for a robot using a system including a robot controller for controlling an operation of the robot, a graphic display device connected to said robot controller, for displaying graphic image of said robot, a pointing device for inputting two-dimensional positions on a display screen of said graphic display device and means for converting the two-dimensional position input through said pointing device into three-dimensional position output using plane position data, said method comprising the steps of:

(A) displaying an initial graphic image representing an orientation of said robot before the start of movement thereof on the display screen of said graphic display device;

(B) starting a two-dimensional position input for the jog feed on the display screen of said graphic display device using said pointing device;

(C) sequentially converting the two-dimensional position input into a three-dimensional position output based on plane position data;

(D) sequentially updating the graphic image of said robot based on said three-dimensional position output;

(E) moving said robot based on said three-dimensional position output using said robot controller;

(F) terminating the two-dimensional position input using said pointing device for the jog feed.

2. A jog-feeding method for a robot according to claim 1, wherein said step (C) is performed externally of said robot controller, and a signal representing said three-dimensional position output is transmitted to said robot controller.

3. A jog-feeding method for a robot according to claim 1, wherein said step (C) is performed within said robot controller, and a signal representing said three-dimensional position output is transmitted to said graphic display device.

4. A jog-feeding method for a robot according claim 1, wherein the display screen of said graphic display device is provided with a touch panel, said two-dimensional position input is performed by a manual touch on said display screen, said two-dimensional position input in said step (B) is started by starting a manual touch on a graphic image of a hand of the robot displayed on the display screen of said graphic display device, and said two-dimensional position input in said step (F) is terminated by terminating the manual touch at a position different from the position where said manual touch was started on said display screen.

5. A jog-feeding method for a robot according to claim 1, wherein said graphic display device has mouse with a function of displaying a mouse cursor, said two-dimensional position input is performed using said mouse, said two-dimensional position input in said step (B) is started by a first click of said mouse with said mouse cursor positioned at a graphic image of a hand of the robot displayed on the display screen of said graphic display device, and said two-dimensional position input in said step (F) is terminated by a second click of said mouse at a position different from the position of said first click of the mouse on said display screen.

6. A jog-feeding method for a robot according to claim 1, wherein said step (E) is performed substantially synchronously with said step (C).

7. A jog-feeding method for a robot according to claim 1, wherein said step (E) is started immediately after completion of said step (F).

8. A jog-feeding method for a robot according to claim 1, wherein said step (E) is started after a predetermined time period set in said system from the time when said step (F) is completed.

9. A jog-feeding method for a robot according to any one of claims 1 to 5, wherein said step (E) is started after a predetermined time period set in said system from the time when said step (B) is completed.

10. A jog-feeding method for a robot according to any one of claims 1 to 9, wherein said plane position data is created based on a line-of-sight on the graphic image of said robot and the latest three-dimensional position data corresponding to the two-dimensional position input.

11. A jog-feeding method for a robot according to claim 1, wherein said plane position data is created based on a direction of a plane previously taught to said system and the latest three-dimensional position data corresponding to the two-dimensional position input.

12. A jog-feeding method for a robot according to claim 2, wherein said graphic display device has is provided with a sensor for detecting a three-dimensional orientation thereof, and a line-of-sight of the graphic image of said robot is determined in accordance with an orientation detected by said sensor.

13. A jog-feeding method for a robot according to claim 3, wherein said graphic display device is provided with a sensor for detecting a three-dimensional orientation thereof, and a line-of-sight of the graphic image of said robot is determined in accordance with an orientation detected by said sensor.

14. A jog-feeding method for a robot according to claim 1, wherein the display screen of said graphic display device comprises a touch panel, said two-dimensional position input is performed by manually touching said display screen, said the two-dimensional position input in said step (B) is started by a manual touch on a graphic image of a hand of the robot displayed on the display screen of said graphic display device, said two-dimensional position input in said step (F) is terminated by terminating the manual touch at a position different from the position where said manual touch was started on said display screen, said graphic display device is provided with a sensor for detecting a three-dimensional orientation thereof, and a line-of-sight of the graphic image of said robot is determined in accordance with an orientation detected by said sensor.

15. A jog-feeding method for a robot according to claim 1, wherein said graphic display device is provided with a mouse having a function of displaying a mouse cursor, said two-dimensional position input is performed using said mouse, said two-dimensional position input in said step (B) is started by a first click of said mouse with said mouse cursor positioned at a graphic image of a hand of the robot displayed on the display screen of said graphic display device, said two-dimensional position input in said step (F) is terminated by a second click of said mouse at a position different from the position of said first click of the mouse on said display screen, said graphic display device is provided with a sensor for detecting a three-dimensional orientation thereof, and a line-of-sight of the graphic image of said robot is determined in accordance with an orientation detected by said sensor.

16. A jog-feeding method for a robot according to claim 1, wherein said step (E) is performed substantially synchronously with said step (C), said graphic display device is provided with a sensor for detecting a three-dimensional orientation thereof, and a line-of-sight of the graphic image of said robot is determined in accordance with an orientation detected by said sensor.

17. A jog-feeding method for a robot according to claim 1, wherein said step (E) is started immediately after completion of said step (F), said graphic display device is provided with a sensor for detecting a three-dimensional orientation thereof, and a line-of-sight of the graphic image of said robot is determined in accordance with an orientation detected by said sensor.

18. A jog-feeding method for a robot according to claim 1, wherein said step (E) is started after a predetermined time period set in said system from the time when said step (F) is completed, said graphic display device is provided with a sensor for detecting a three-dimensional orientation thereof, and a line-of-sight of the graphic image of said robot is determined in accordance with an orientation detected by said sensor.

19. A jog-feeding method for a robot according to claim 1, wherein said step (E) is started after a predetermined time period set in said system from the time when said step (B) is completed, said graphic display device is provided with a sensor for detecting a three-dimensional orientation thereof, and a line-of-sight of the graphic image of said robot is determined in accordance with an orientation detected by said sensor.

20. A jog-feeding method for a robot according to claim 1, wherein said plane position data is created based on a line-of-sight of the graphic image of said robot and the latest three-dimensional position data corresponding to the two-dimensional position input, said graphic display device is provided with a sensor for detecting a three-dimensional orientation thereof, and the line-of-sight of the graphic image of said robot is determined in accordance with an orientation detected by said sensor.

21. A jog-feeding method for a robot according to claim 1, wherein said plane position data is created based on a direction of a plane previously taught to said system and the latest three-dimensional position data corresponding to the two-dimensional position input, said graphic display device is provided with a sensor for detecting a three-dimensional orientation thereof, and a line-of-sight of the graphic image of said robot is determined in accordance with an orientation detected by said sensor.

* * * * *

UNITED STATES PATENT AND TRADEMARK OFFICE
CERTIFICATE OF CORRECTION

PATENT NO. : 6,088,628
DATED : July 11, 2000
INVENTOR(S) : Atsushi Watanabe, et al.

It is certified that error appears in the above-identified patent and that said Letters Patent is hereby corrected as shown below:

Item [56] References Cited 5,608,618     change "Koaka" to -- Kosaka --.
5,748,854     change "Watanable" to -- Watanabe --.
5,980,082     change "Watanable" to -- Watanabe. --

Column 6,
Line 65, change "A" to -- A --.

Column 14,
Lines 54-55, change "any of one of claims 1 to 5" to -- claim 1 --.
Lines 58-59, change "any one of claims 1 to 9" to -- claim 1 --.

Signed and Sealed this

Seventh Day of August, 2001

*Attest:*

NICHOLAS P. GODICI
*Attesting Officer*     *Acting Director of the United States Patent and Trademark Office*